United States Patent [19]
Kirk et al.

[11] 4,176,779
[45] Dec. 4, 1979

[54] HYDRAULIC INERTIA CENTRIFUGAL CATALYTIC DESALINATION DEVICE

[76] Inventors: Clair F. Kirk, 856 Pine St., Wheatland, Wyo. 82201; Samuel A. Kirk, Box 65, Pringle, S. Dak. 57773

[21] Appl. No.: 874,709

[22] Filed: Feb. 2, 1978

[51] Int. Cl.² ............................................... B04B 5/04
[52] U.S. Cl. .......................................... 233/32; 233/46
[58] Field of Search .................... 233/32, 33, 13, 17, 233/27, 28, 46, 47 R, 1 R

[56] References Cited
U.S. PATENT DOCUMENTS

| | | | |
|---|---|---|---|
| 3,027,390 | 3/1962 | Thurman | 233/32 X |
| 3,880,347 | 4/1975 | Kirk et al. | 233/32 |

Primary Examiner—George H. Krizmonich

[57] ABSTRACT

The present device separates salts from water by utilizing hydraulic force, the force of inertia, centrifugal force and the catalytic similarities produced by hydrogen in a process named, Desalination By The Inverse Function Of The Known "Salting-Out" Effect, which establishes differential density within the high gravity chamber of the centrifugal rotor.

1 Claim, 4 Drawing Figures

FIGURE 2

HYDRAULIC INERTIA CENTRIFUGAL CATALYTIC DESALINATION DEVICE

CROSS-REFERENCE TO RELATED APPLICATION

The present device is an improved rotor for a centrifuge in accordance with U.S. Pat No. 3,880,347 and is used for the purpose of desalination of saline water. The herein disclosure, with respect to the inverse function of the salting-out effect, is duplication from a separate specification, that is being filed at the same time, titled, Desalination By The Inverse Function Of The Known "Salting-out" Effect Within An Improved Centrifuge. The present device is an interchangeable rotor for U.S. Pat. No. 3,880,347 which adapts it to the said desalination. This desalination modification on the rotor occurs in the high gravity chamber illustrated by FIGS. 2 and 3 of U.S. Pat. No. 3,880,347 and the present drawings, FIGS. 1 and 2 are cross sectioned on plane AB on FIG. 1, U.S. Pat. No. 3,880,347.

BACKGROUND OF THE INVENTION

In U.S. Pat. No. 3,309,016, O'Brien states a computation of centrifugal force required to remove salts from water. This amount of centrifugal force was reduced by Kirk's in U.S. Pat. No. 3,430,853 by removing swirl from within the high gravity chamber. In U.S. Pat. No. 3,880,347 the Kirk's added inertia as a separation force.

BRIEF SUMMARY OF INVENTION

The present device establishes the inverse function of the "salting-out" effect and a sink-float process utilizing artifical gravity and inertia after the catalytic similarities of hydrogen have established differential density. The inverse function of the "salting-out" effect has similarities to the common ion effect.

The present device establishes conditions necessary to formulate a direct attack on the homogeneous nature of the saline mixture by a catalytic agent. Hydrogen gas pressure cavities trap hydrogen gas under pressure to establish a layer of water and hydrogen which is tapped for removal.

BRIEF DESCRIPTION OF DRAWINGS

The present device is an interchangeable rotor for U.S. Pat. No. 3,880,347 which is not completely adapted to the use of hydrogen for its catalytic effect. This desalination modification on the rotor occurs in the high gravity chamber illustrated by FIGS. 2 and 3.

The present

The present FIG. 1 is the inlet rotor half and FIG. 2 is the outlet half. The rotor is comprised of a first tubular shaft, internal wall 1 of FIG. 1, a chamber of pockets 2 and 3 of FIGS. 1 and 2, and a second tubular shaft attached to, and behind, rotor end plate 4 of FIG. 2. The high gravity chamber comprises pockets 2 and 3. The stated elements remain the same as U.S. Pat. No. 3,880,347 rotor elements.

Figure 1:
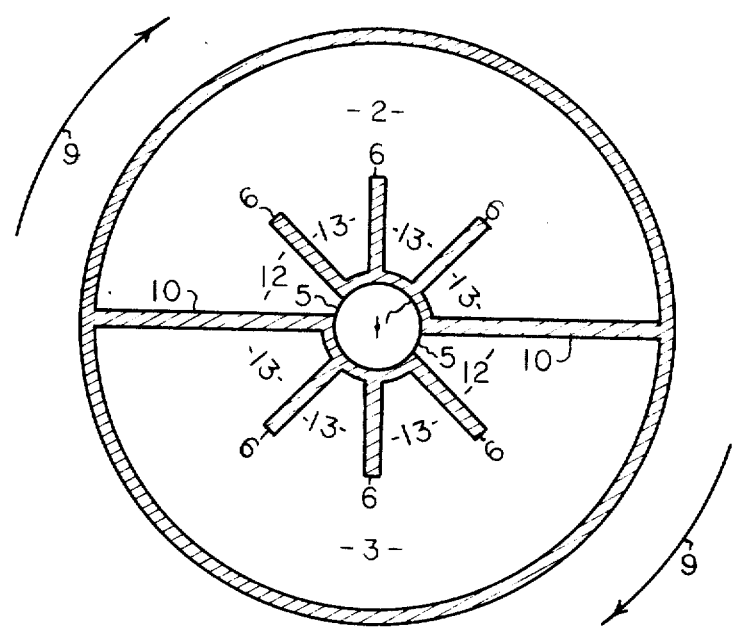
FIGS. 1 and 2 are cross sections of the improved rotor. They are referenced to FIG. 2 and 3 of U.S. Pat. No. 3,880,347 and they are cross sectioned on plane AB on FIG. 1.
Figure 2:
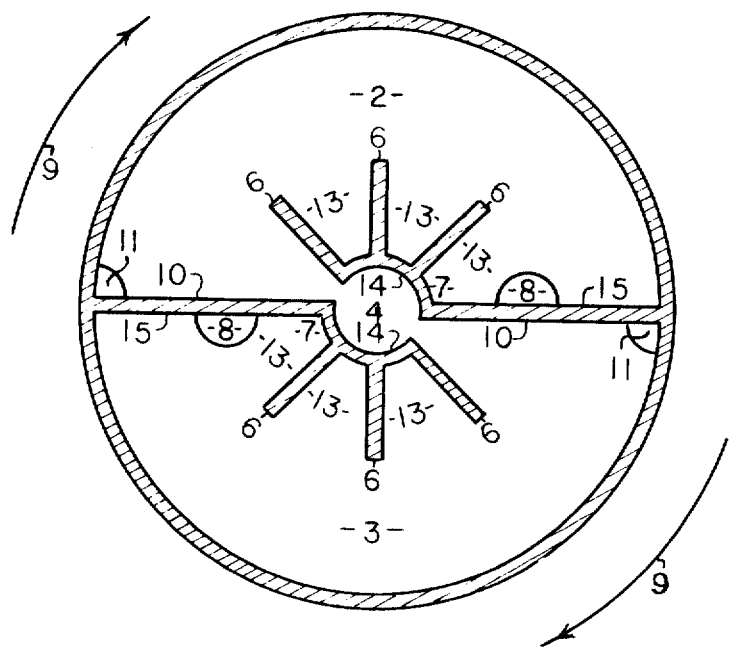

The modification consists of a change to the high gravity chamber inlet 5 of FIG. 1, the addition of numerous baffles 6 of FIGS. 1 and 2, and moving the lights outlet from position 7 of FIG. 2 to position 8.

Figure 3:
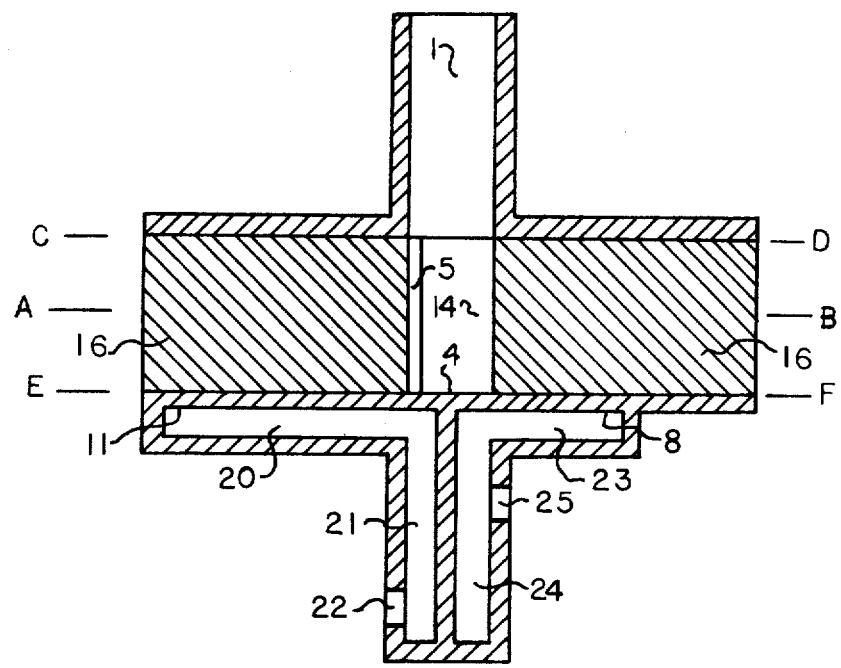
Figure 4:
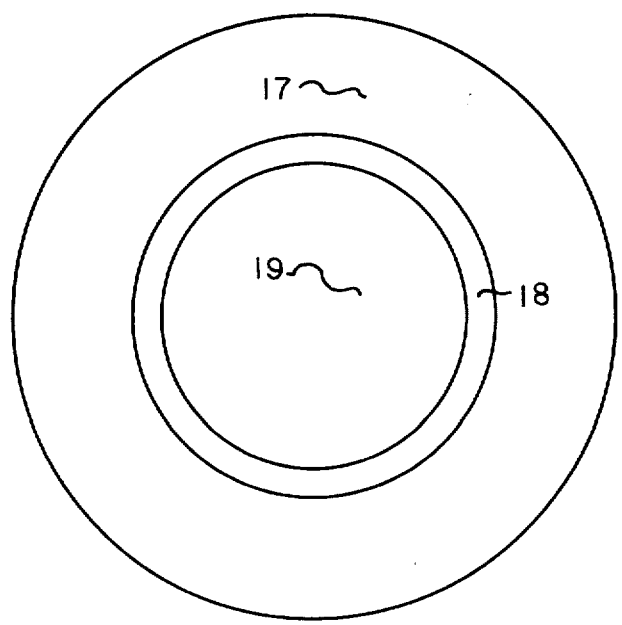

FIG. 3 is an axial cross section of the rotor. FIG. 1 is a cross section of FIG. 3 on line AB looking up. FIG. 2 is a cross section of FIG. 3 on line AB looking down. FIG. 3 is cross sectioned to illustrate the flow through the rotor. Wall 16 divides the high gravity chamber into two pockets. Surface 15 on wall 16 is the leading surface of a pocket. Surface 10 on wall 16 is the lagging surface of a pocket. The high gravity chamber is internal of the rotor between plane CD and plane EF. Baffles 6 on FIGS. 1 and 2 extend between planes CD and EF. The axial ends of baffles 6 are joined to form high gravity chamber support 14.

DETAILED DESCRIPTION OF INVENTION

The input to the improved rotor is a pressurized mixture of saline water and hydrogen gas. The entry illustration is the axial cross section FIG. 3 compartment 1. FIG. 1 is a cross section on line AB of FIG. 3 looking up. Compartment 1 is also illustrated on FIG. 1. Delivery is made through the high gravity chamber inlets, 5 on FIG. 3, to the lagging surfaces of the two pocket high gravity chamber.

Heavies move through the layer developing chambers, 12 on FIG. 1, along the chamber pocket lagging surfaces 10 to high gravity chamber pocket heavies separation fraction outlets, 11 on FIG. 2. FIG. 2 is a cross section on line AB of FIG. 3 looking down.

On FIG. 3, delivery from 11 is received by passage means 20 which delivers to the first compartment of the second compartment shaft, 21 on FIG. 3. The heavies separation fraction outlet from the improved rotor is outlet 22 on FIG. 3.

Moving out of the layer developing chamber, 12 on FIG. 1, hydrogen gas is trapped in the hydrogen gas pressure cavities, 13 on FIGS. 1 and 2.

The lights separation fraction moving out of the layer developing chamber, 12 on FIG. 1, develops streamline flow to establish a sink-float separation process which outlets from the two pocket high gravity chamber at lights outlet, 8 on FIG. 2.

Lights outlet 8 delivers to the lights passage means, 23 on FIG. 3, which delivers to the second compartment of the second compartment shaft, 24 on FIG. 3.

The lights separation fraction rotor outlet is lights outlet, 25 on FIG. 3.

The title word catalytic is used in the general sense to describe the attack on the homogeneous nature of salts ionized by the dipole structure of the water molecule. The hydrogen catalytic connotation is a summation of forces internal to the liquid caused by hydrogen which establishes differential density. The three forces are electrostatic repulsion, Van der Waals force sometimes called London forces and also dispersion forces, and externally applied hydraulic force to the hydrogen gas which produces effects similar to the common ion effect. The total process of separation within the high gravity chamber of the present device is herein termed the inverse function of the salting-out effect.

Function of the present device requires that a mixture of hydrogen gas and saline water be developed externally and that the mixture be under hydraulic pressure at the inlet. The present device inlet is the compartment formed by internal wall 1 of FIG. 1 of the first compartment shaft. Inlet to the high gravity chamber is at positions 5 of FIG. 1.

Upon arrival at the high gravity chamber inlet, the hydrogen catalyst has confused the liquid properties of the saline water to establish differential density. Ionization of part of the hydrogen produces metalic ion which exerts an electrostatic repulsion on the other metalic ions. The hydrogen molecules also exert an electrostatic repulsion on the metalic ions. Sodium chloride, being the most common salt, is used as the explanation medium.

Arrows 9 of FIGS. 1 and 2 indicate the clockwise direction of rotor rotation which makes surfaces 10 the lagging surfaces of pockets 2 and 3. Upon entry of the mixture at the high gravity chamber inlet 5, electrostatic repulsion has formed sodium chloride molecules of largest density herein termed heavies. The mass of the heavies causes inertia to force them against the lagging surface of the pocket 10 where centrifugal force pulls them to the high gravity chamber heavies outlet 11 of FIG. 2.

The heavies are forced out of the high gravity chamber by hydraulic back pressure developed by an external valve in the lights outlet plumbing illustrated on FIG. 1 in U.S. Pat. No. 3,880,347. Delivery is to the first compartment of the second compartment shaft which is the device outlet illustrated on FIG. 3.

The remaining mixture in the layer developing chamber 12 of FIG. 1, formed by the pocket lagging surface and the lagging surface of the first adjacent baffle 6, is acted upon by the Van der Waals force to establish differential density. This force attaches hydrogen molecules to the poles of the dipole water molecule. Hydraulic pressure streamline flow and centrifugal force develop a most dense layer of water containing ionized salts, a layer of water containing hydrogen, and a least dense layer of hydrogen gas.

The layer of hydrogen gas spills around the peripheral ends of the numerous baffles 6 and fills the hydrogen gas pressure cavities 13 of FIG. 1. These cavities are formed by the remaining surfaces of the numerous baffles 6 and the high gravity chamber support 14.

Streamline flow in pockets 2 and 3 of FIGS. 1 and 2 helps establish the sink-float process. The hydrogen gas floats the water out of the water containing salts. The hydrogen gas pressure cavities develops back pressure which produces the inverse function of the salting-out effect which has similarities to the common ion effect and the gas absorption theory. Hydrogen gas is the float medium used in removing water from the high gravity chamber by streamline flow.

The high gravity chamber lights outlet 8 of FIG. 2 is positioned against the leading surface of the pocket 15 of FIG. 2 on the arc of the peripheral ends of the numerous baffles 6.

Streamline flow delivery from the high gravity chamber lights outlet 8 of FIG. 2 is to the second compartment of the second compartment shaft which is the device out-let illustrated on FIG. 3.

We claim:

1. A device which is a centrifuge rotor with hydrogen gas pressure cavities which trap hydrogen gas to utilize the catalytic properties in the desalination of saline water, said rotor comprising a rotatable high gravity chamber, a first compartment shaft providing an inlet to said chamber, a second compartment shaft providing two compartment outlets to said chamber, said chamber comprising a cylinder arranged to rotate with said first and second shafts, said cylinder being positioned intermediate the inlet portion of said first shaft and the outlet portions of said second shaft, said cylinder sectioned into at least one separating pocket chamber by a wall, extending radially from cylinder center proximity to the circumference and joined to said cylinder internal ends and at the circumference, said wall providing a lagging and leading surface for said rotatable pocket, said first compartment shaft arranged to deliver pressurized mixture to the lagging surface of said pocket, a heavies separation fraction outlet positioned at the circumference end of said lagging surface, means for passing said heavies from said heavies to the first compartment of said second shaft, a heavies rotor outlet from said first compartment of said second shaft, numerous baffles joined at their axial ends and to said cylinder internal ends, extending radially toward the circumference of said cylinder providing hydrogen gas pressure cavities, said baffle adjacent said lagging surface providing a layer developing chamber, a lights separation fraction outlet positioned on the leading surface of said pocket on the arc of the peripheral ends of said baffles, means for passing said lights from said lights outlet to the second compartment of said second shaft, a lights rotor outlet from the said second compartment of the second said shaft.

* * * * *